(12) United States Patent
Bandyopadhyay et al.

(10) Patent No.: US 10,169,562 B2
(45) Date of Patent: Jan. 1, 2019

(54) ACTIVITY RECOGNITION TO CONFIRM SECURE AUTHENTICATION OF A USER

(71) Applicant: International Business Machines Corporation, Armonk, NY (US)

(72) Inventors: Sambaran Bandyopadhyay, Hooghly (IN); Vijay Ekambaram, Tamilnadu (IN); Saravanan Sadacharam, Chennai (IN); Ashok Pon Kumar Sree Prakash, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 134 days.

(21) Appl. No.: 14/837,334

(22) Filed: Aug. 27, 2015

(65) Prior Publication Data
US 2017/0061112 A1    Mar. 2, 2017

(51) Int. Cl.
| | | |
|---|---|---|
| *H04L 9/32* | (2006.01) | |
| *G06F 21/40* | (2013.01) | |
| *G06F 21/34* | (2013.01) | |
| *G06F 21/35* | (2013.01) | |
| *H04L 29/06* | (2006.01) | |
| *G06F 21/44* | (2013.01) | |
| *H04W 12/06* | (2009.01) | |

(52) U.S. Cl.
CPC ............ *G06F 21/34* (2013.01); *G06F 21/35* (2013.01); *G06F 21/445* (2013.01); *H04L 63/0853* (2013.01); *H04L 63/18* (2013.01); *H04W 12/06* (2013.01); *H04L 2463/082* (2013.01)

(58) Field of Classification Search
CPC ............ G06F 21/30; G06F 21/40; H04L 9/32
USPC ............ 726/5–7, 22; 713/150–155; 455/466
See application file for complete search history.

(56) References Cited

U.S. PATENT DOCUMENTS

| | | |
|---|---|---|
| 8,112,065 B2 | 2/2012 | Choi et al. |
| 8,407,465 B2 | 3/2013 | Naaman et al. |
| 8,601,266 B2 | 12/2013 | Aabye et al. |
| (Continued) | | |

OTHER PUBLICATIONS

Marforio et al. "Smartphones as Practical and Secure Location Verification Tokens for Payments", 2014 Network and Distributed System Security (NDSS) Symposium; Feb. 2014.
(Continued)

*Primary Examiner* — Lynn D Feild
*Assistant Examiner* — Viral S Lakhia
(74) *Attorney, Agent, or Firm* — Brown & Michaels, PC; David Woycechowsky (57) ABSTRACT

A method of two-factor authentication for gaining access to an application using at least a first device and a second device registered to a user. The first and second devices each have a plurality of sensors for detecting activity modalities of the user on the first and the second devices and are in communication with a server computer. In the method, the server computer: receives credentials and detected activity modality for gaining access to the application from the first device; sends a request to the second device registered to the user for activity modality of the user; receives the detected activity modality from the second device; compares the detected activity modality of first device to the detected activity modality of the second device; and if the detected activity modalities of first device and the second device match, granting access to the user on the first device to the application.

20 Claims, 4 Drawing Sheets

(56) References Cited

U.S. PATENT DOCUMENTS

| | | | |
|---|---|---|---|
| 8,646,056 B2 | 2/2014 | Poplett | |
| 9,426,139 B1* | 8/2016 | McClintock | H04L 63/08 |
| 2003/0166397 A1 | 9/2003 | Aura | |
| 2010/0024017 A1 | 1/2010 | Ashfield et al. | |
| 2011/0189981 A1* | 8/2011 | Faith | G06F 1/1694 |
| | | | 455/414.1 |
| 2012/0311320 A1* | 12/2012 | Brown | G06Q 20/3274 |
| | | | 713/155 |
| 2013/0219487 A1* | 8/2013 | Ujiie | H04L 63/107 |
| | | | 726/16 |
| 2013/0282589 A1* | 10/2013 | Shoup | G06F 21/34 |
| | | | 705/67 |
| 2014/0096215 A1* | 4/2014 | Hessler | H04L 63/0869 |
| | | | 726/7 |
| 2014/0165170 A1 | 6/2014 | Dmitriev et al. | |
| 2014/0187275 A1* | 7/2014 | Lau | H04W 4/14 |
| | | | 455/466 |
| 2014/0237591 A1* | 8/2014 | Niemela | H04L 63/0853 |
| | | | 726/22 |
| 2014/0254769 A1* | 9/2014 | Chicchetti | A61B 6/563 |
| | | | 378/204 |
| 2014/0282927 A1* | 9/2014 | McLaughlin | G06F 21/31 |
| | | | 726/5 |
| 2014/0337243 A1 | 11/2014 | Dutt et al. | |
| 2014/0344904 A1* | 11/2014 | Venkataramani | G06F 21/35 |
| | | | 726/5 |
| 2015/0227732 A1* | 8/2015 | Doctor | G06F 21/31 |
| | | | 726/4 |
| 2015/0242601 A1* | 8/2015 | Griffiths | G06F 21/305 |
| | | | 726/5 |
| 2015/0244699 A1* | 8/2015 | Hessler | G06F 21/44 |
| | | | 726/7 |
| 2015/0381621 A1* | 12/2015 | Innes | G06F 21/31 |
| | | | 726/7 |
| 2016/0028736 A1* | 1/2016 | Gehring | H04L 63/102 |
| | | | 726/4 |
| 2016/0189147 A1* | 6/2016 | Vanczak | G06Q 20/32 |
| | | | 705/71 |
| 2016/0219039 A1* | 7/2016 | Houthooft | H04L 9/3215 |
| 2016/0342996 A1* | 11/2016 | Navarro Luft | G06Q 20/32 |
| 2017/0026974 A1* | 1/2017 | Dey | H04W 4/025 |

OTHER PUBLICATIONS

Srinivasan et al. "Activity Recognition using Actigraph Sensor", Proceedings of the International workshop on Knowledge Discovery from Sensor Data; 2010.

Miluzzo et al. "Pocket, Bag, Hand, etc.—Automatically Detecting Phone Context through Discovery", In First International Workshop on Sensing for App Phones (PhoneSense'10) (2010).

LGM de al Vega et al. "Exploring unconstrained mobile sensor based human activity recognition", 3rd International Workshop on Mobile Sensing, 2013.

Hemamalini et al. "Credit Card Forgery Identification System with Location Based Tracking Using Mobiles with GPS", International Journal of Communication Network and Security (IJCNS), vol. 1, Issue-3; 2011.

\* cited by examiner

ACTIVITY RECOGNITION TO CONFIRM SECURE AUTHENTICATION OF A USER

BACKGROUND

The present invention relates to authentication in an on-line computer system, and more specifically to using user activity recognition to determine authentication of a user of the system.

Authentication of a user's identity to allow the user access to secure information is often carried out using two-factor authentication. Two-factor authentication identifies users through the combination of two different components. The components may be a physical object in the possession of the user, some secret known to the user or some physical characteristic of the user such as biometrics.

Mobile phones have been used as part of the two-factor authentication process. In this approach, the users who want to authenticate themselves on a computer system enter their personal access information (i.e. something that only the individual user knows) into the computer system. The computer system sends a one-time-valid, dynamic passcode consisting of digits or information to a mobile device associated with the user in the records of the computer system. The mobile device could be a mobile phone or tablet, and the passcode can be sent as text or embedded into a quick response (QR) code received on the mobile device. The code is may be sent to the mobile device by short message service (SMS) or via a special app.

The user would then need to enter the passcode sent to their mobile device to provide the information to an authentication query. Alternatively, an authentication code may be embedded into the headers (e.g. originating address) of the message sent to the mobile device, so that the user only needs to reply to the message in order to authorize and authenticate. Thus, current methods of two-factor authentication with a mobile phone requires manual effort/input from the user and can be bothersome to the user.

Authentication of the user may be carried out using other methods, such as detection of suspicious events. The suspicious events may be detected by tracking internet protocol (IP) addresses. If the user request comes from an unknown IP address, suspicious IP address, or from an IP address from a different geographical location, then the system may consider these events to be suspicious and require a second factor for authentication of the user.

The suspicious events may also be detected by tracking HTTP cookies. For example, when a webpage which requires authentication is accessed from a new device, the authentication sends a HTTP cookie to the server of the webpage to notify the website of the user's previous activity. When the user's activity does not match, for example authentication of the user's identity through a device was not previously used, a second factor for authentication to confirm the user's identity may be required.

SUMMARY

According to one embodiment of the present invention, a method of two-factor authentication for gaining access to an application using at least a first device and a second device registered to a user is disclosed. The first device and the second device each have a plurality of sensors for detecting activity modalities of the user on the first and the second devices. The first device and the second devices are in communication with a server computer. The method comprising the steps of: the server computer receiving credentials and at least one detected activity modality for gaining access to the application from the first device; the server computer sending a request to the second device registered to the user for at least one activity modality of the user; the server computer receiving the at least one detected activity modality from the second device; the server computer comparing the at least one detected activity modality of first device to the at least one detected activity modality of the second device; and if the detected activity modalities of first device to the detected activity modalities of the second device match, granting access to the user on the first device to the application.

According to another embodiment of the present invention, a method of a user gaining access to an application using at least a first device and a second device registered to the user through two-factor authentication is disclosed. The first device and the second device each having: a plurality of sensors for detecting activity modalities of the user on the first and the second devices and in communication with a server computer. The method comprising the steps of: the first device of the user receiving credentials to access the application; the first device of the user capturing the at least one detected activity modality on the first device; the first device of the user sending the credentials and the at least one detected activity modality to the server computer; the second device of the user receiving a request for at least one activity modality of the user on the second device from the server computer; the second device of the user capturing the at least one detected activity modality; the second device sending the at least one detected activity modality to the server computer; and at least the first device receiving an indication from the server computer whether access to the application is granted.

According to yet another embodiment of the present invention, a computer program product for two-factor authentication for gaining access to an application using at least a first device and a second device registered to a user. The first device and the second device are in communication with a server computer comprising a computer comprising at least one processor, one or more memories, one or more computer readable storage media, and the first device and second device each have: a computer comprising at least one processor, one or more memories, one or more computer readable storage media, and a plurality of sensors for detecting activity modalities of the user on the first and the second devices. The computer program product comprising a computer readable storage medium having program instructions embodied therewith, the program instructions executable by the computer to perform a method comprising: receiving, by the server computer, credentials and at least one detected activity modality for gaining access to the application from the first device; sending, by the server computer, a request to the second device registered to the user for at least one activity modality of the user; receiving, by the server computer, the at least one detected activity modality from the second device; comparing, by the server computer, the at least one detected activity modality of first device to the at least one detected activity modality of the second device; and if the detected activity modalities of first device to the detected activity modalities of the second device match, granting access, by the server computer to the user on the first device to the application.

According to another embodiment of the present invention, a computer system for two-factor authentication for gaining access to an application using at least a first device and a second device registered to a user. The first device and the second device are in communication with a server computer comprising at least one processor, one or more memories, one or more computer readable storage media having program instructions executable by the computer to perform the program instructions. The first device and the second device each comprising at least one processor, one or more memories, a plurality of sensors for detecting activity modalities of the user on the first and the second devices, one or more computer readable storage media having program instructions executable by the computer to perform the program instructions. The program instructions comprising: receiving, by the server computer, credentials and at least one detected activity modality for gaining access to the application from the first device; sending, by the server computer, a request to the second device registered to the user for at least one activity modality of the user; receiving, by the server computer, the at least one detected activity modality from the second device; comparing, by the server computer, the at least one detected activity modality of first device to the at least one detected activity modality of the second device; and if the detected activity modalities of first device to the detected activity modalities of the second device match, granting access, by the server computer to the user on the first device to the application.

According to another embodiment of the present invention, a computer system for a user to gain access to an application using at least a first device and second device registered to the user through two-factor authentication is disclosed. The first device and the second device are in communication with a server computer comprising at least one processor, one or more memories, one or more computer readable storage media having program instructions executable by the computer to perform the program instructions. The first device and the second device each comprising at least one processor, one or more memories, a plurality of sensors for detecting activity modalities of the user on the first and the second devices, one or more computer readable storage media having program instructions executable by the computer to perform the program instructions. The program instructions comprising: receiving, by the first device of the user, credentials to access the application; capturing, by the first device of the user, the at least one detected activity modality on the first device; sending, by the first device, the credentials and the at least one detected activity modality to the server computer; receiving, by the second device of the user, a request for at least one activity modality of the user on the second device from the server computer; capturing, by the second device of the user, the at least one detected activity modality; sending, by the second device of the user, the at least one detected activity modality to the server computer; and receiving, by at least the first device of the user, an indication from the server computer whether access to the application is granted.

DETAILED DESCRIPTION

It will be recognized that in the illustrative embodiments the term "activity modalities" refers to a user's behavior determined by sensors of a user's registered devices. The activity modality may determine location state, locomotive states, directions states, working states and other states of the user.

It will be recognized that in the illustrative embodiment of the present invention, two-factor authentication takes place with no direct input from the user for the second factor of the two factor authentication.

In a first component of the two-factor authentication process, a user uses a first device to secure access to a secure application. It should be noted that the term "secure application" as used herein refers to software, information, or access to any type of information which requires authentication of the user. Activity modalities of the user, detected through the first device are sent to a server computer for verification with credentials provided by the user to access the secure application. The credentials as provided by the user and the detected activity modalities are the first factor of the authentication of the user.

A second device registered to the user, in possession of or in close proximity to the user, is used to obtain activity modalities of the user which can be compared to the activity modalities associated with the credentials received from the first device. The activity modalities obtained from the second device is the second component of the two-factor authentication process and does not require direct input from the user.

If a mismatch between the activity modalities of the first device and the second device is present, access to the secure application is denied and additional authentication of the user may be necessary. Additionally, a notification may be sent to the second device alerting the user.

Figure 1:
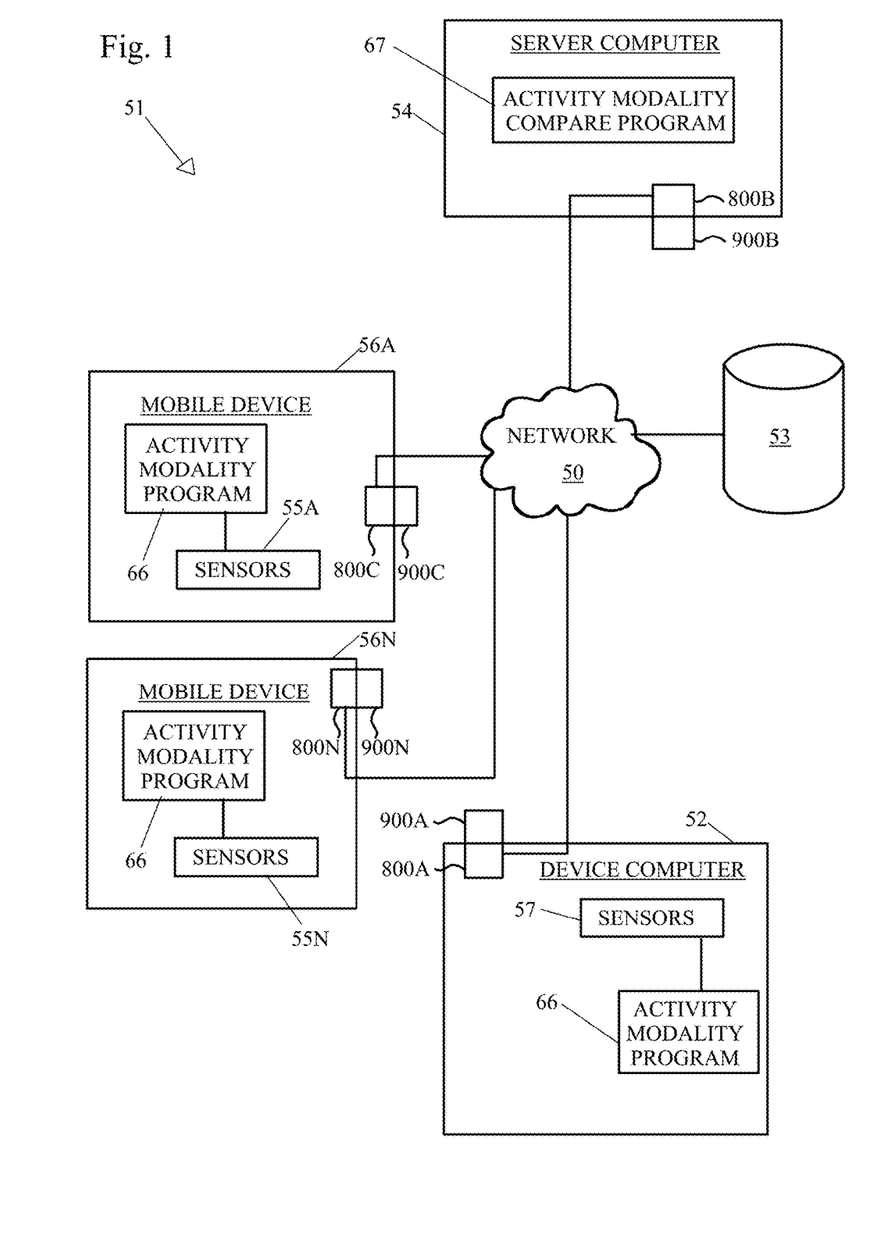
FIG. 1 depicts an exemplary diagram of a possible data processing environment in which illustrative embodiments may be implemented.

FIG. 1 is an exemplary diagram of a possible data processing environment provided in which illustrative embodiments may be implemented. It should be appreciated that FIG. 1 is only exemplary and is not intended to assert or imply any limitation with regard to the environments in which different embodiments may be implemented. Many modifications to the depicted environments may be made.

Referring to FIG. 1, network data processing system 51 is a network of computers in which illustrative embodiments may be implemented. Network data processing system 51 contains network 50, which is the medium used to provide communication links between various devices and computers connected together within network data processing system 51. Network 50 may include connections, such as wire, wireless communication links, or fiber optic cables.

In the depicted example, device computer 52, mobile devices 56a-56n, a repository 53, and a server computer 54 connect to network 50. In other exemplary embodiments, network data processing system 51 may include additional client or device computers, mobile devices, storage devices or repositories, server computers, and other devices not shown.

Each of the mobile devices 56a-56n include one or more sensors 55a-55n. The plurality of sensors 55a-55n may be, but are not limited to, one or more of the following: a light sensor, accelerometer, camera, gyroscope, microphone, magnetometer, compass, digital compass, global positioning system (GPS) receiver, and other sensors. The plurality of sensors 55a-55n are used to detect activity modalities of the user, such as location state of the user (geographical location of the user from a GPS or location relative to a known source such as a cell tower or wireless access point), locomotive state of the user (whether the user is moving—walking, running, standing, located in a moving vehicle, etc. . . . ), direction state of the user (direction the user is facing, either compass direction or direction relative to a landmark), and working state of the user (whether the user is idle or actively using the device).

The mobile devices 56a-56n are preferably able to send the detected states or activity modalities to a server computer 54. The mobile device 56a-56n may be, but is not limited to a mobile device, a cell phone, smart phone, a personal digital assistant, a netbook, a laptop computer, a tablet computer, a wearable computer, or any other type of mobile computing device. The mobile devices 56a-56n may be the same type of computer or they may be different (e.g. mobile phone and wearable computing device).

Alternatively, while two mobile devices are shown, one of the computers could be fixed in location, as in a desktop computer. The mobile devices 56a-56n include a set of internal components 800c, 800n and a set of external components 900c, 900n further illustrated in FIG. 6.

Mobile devices 56a-56n may contain an interface. The interface may accept commands and data entry from a user. The interface can be, for example, a command line interface, a graphical user interface (GUI), a web user interface (WUI), a natural user interface (NUI) or a touch user interface (TUI). The mobile devices 56a-56n preferably includes an activity modality program 66.

Figure 6:
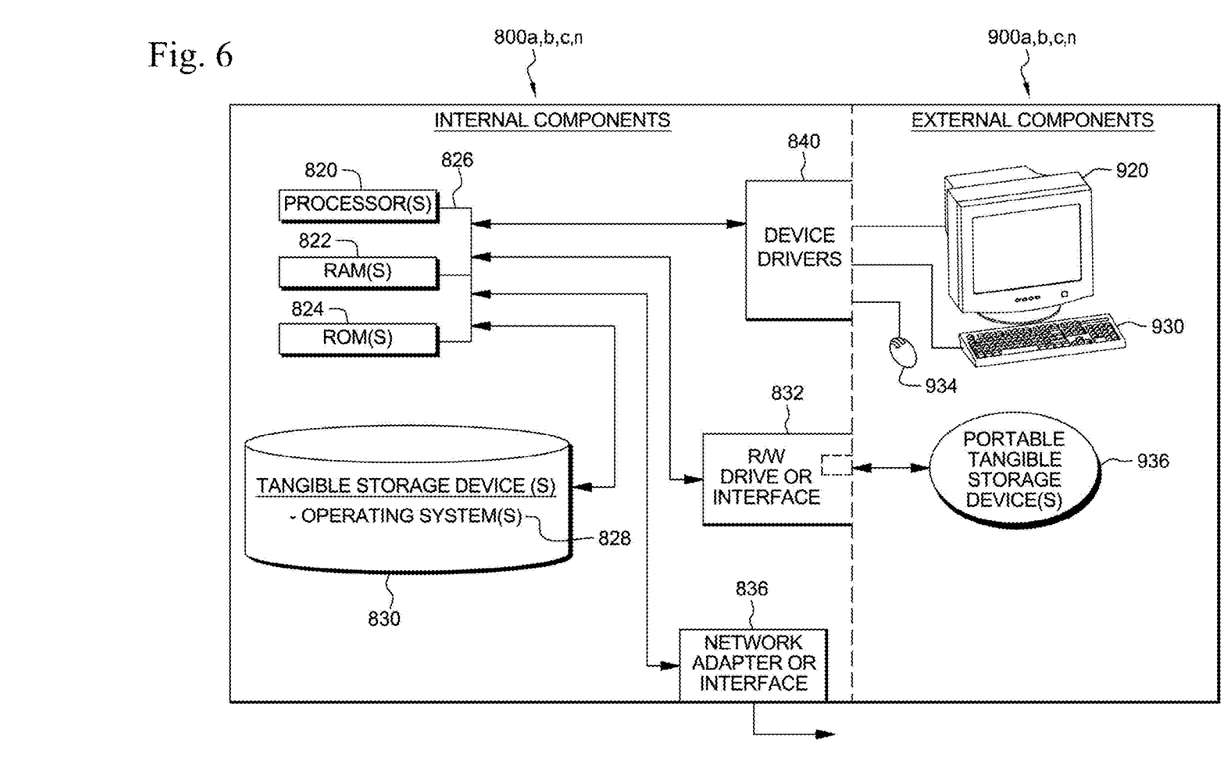
FIG. 6 illustrates internal and external components of a client or device computer and a server computer in which illustrative embodiments may be implemented.

Device computer 52 includes a set of internal components 800a and a set of external components 900a, further illustrated in FIG. 6. Device computer 52 may be, for example, a mobile device, a cell phone, a smart phone, a personal digital assistant, a netbook, a laptop computer, a tablet computer, a desktop computer, television, a wearable computer device, or any other type of computing device. The device computer 52 is preferably able to receive input from the plurality of sensors 57. The plurality of sensors 57 may be, but is not limited to a light sensor, accelerometer, camera, digital compass, gyroscope, microphone, magnetometer, compass, global positioning system (GPS) receiver, and other sensors. The plurality of sensors 57 are used to detect activity modalities of the user, such as location state of the user (location of the user), locomotive state of the user (whether the user is moving—walking, running, standing, walking, etc. . . . ), direction state of the user (direction the user is facing), and working state of the user (whether the user is idle or working on the device). The device computer is preferably able to send the detected states or activity modalities to a server computer 54. The device computer 52 may be the same type computer as the mobile devices 56a-56n or they may be different (e.g. desktop and mobile phone).

Device computer 52 may contain an interface. The interface may accept commands and data entry from a user. The interface can be, for example, a command line interface, a graphical user interface (GUI), a web user interface (WUI), a natural user interface (NUI) or a touch user interface (TUI). The device computer 52 preferably includes an activity modality program 66.

Server computer 54 includes a set of internal components 800b and a set of external components 900b illustrated in FIG. 6. In the depicted example, server computer 54 provides information, such as boot files, operating system images, and applications to device computer 52 and mobile devices 56a-56n. Server computer 54 can compute the information locally or extract the information from other computers on network 50. The server preferably includes an activity modality compare program 67.

Program code and programs such as a activity modality program 66 and activity modality compare program 67 may be stored on at least one of one or more computer-readable tangible storage devices 830 shown in FIG. 6, on at least one of one or more portable computer-readable tangible storage devices 936 as shown in FIG. 6, on repository 53 connected to network 50, or downloaded to a data processing system or other device for use. For example, program code and programs such as the activity modality program 66 may be stored on at least one of one or more tangible storage devices 830 on server computer 54 and downloaded to the device computer 52 and mobile devices 56a-56n.

Alternatively, server computer 54 can be a web server, and the program code and programs such as the activity modality program 66 may be stored on at least one of the one or more tangible storage devices 830 on server computer 54 and accessed on the device computer 52 and mobile devices 56a-56n. In other exemplary embodiments, the program code and programs such as the activity modality program 66 and activity modality compare program 67 may be stored on at least one of one or more computer-readable tangible storage devices 830 on server computer 54 or distributed between two or more servers.

Figure 2:
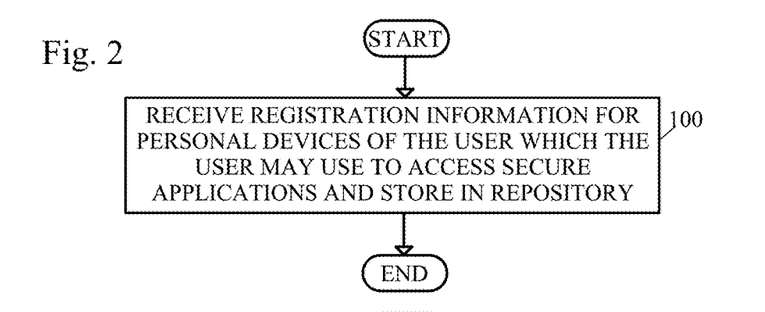
FIG. 2 shows a flow diagram of a method of registering devices of the user which can be queried for activity modalities.

FIG. 2 shows a flow diagram of a method of registering devices of the user which can be queried for activity modalities. In a first step (step 100), the server computer receives registration information for personal devices of the user and stores the information in a repository and the method ends. The repository may be repository 53 of FIG. 1. The registration information may include, but is not limited to phone number, the unique ID number associated with a computer (SIMM card identification or a name assigned to the mobile device, etc.), IP address, or token/channel IDs as using in push messaging services.

The registered personal devices are devices which may be used to access secure applications and may be used as part of the authentication process of the user. The device may be the device computer 52 and/or the mobile devices 56a-56n of FIG. 1. Preferably at least one device is registered per user.

Figure 3:
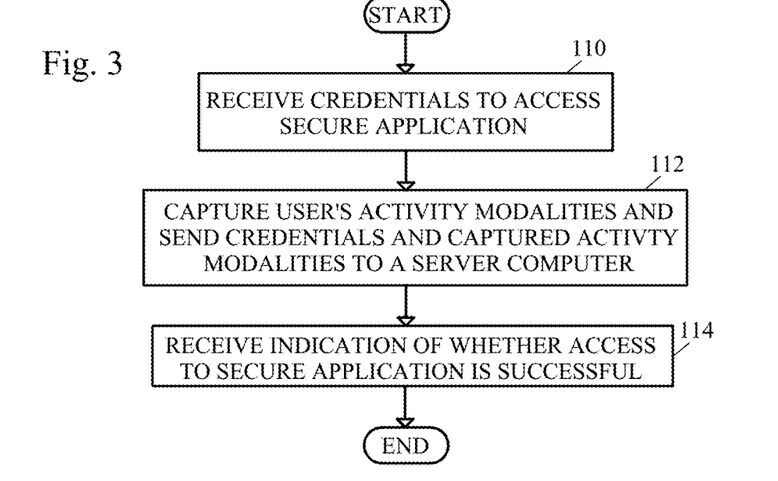
FIG. 3 shows a flow diagram of a method of capturing activity modalities of the user on a first device in which the user is attempting to access a secure application.

FIG. 3 shows a flow diagram of a method of capturing activity modalities of the user on a first device in which the user is attempting to access a secure application or the first component of the two-factor authentication process. A first device, either a mobile device 56a-56n or a device computer 52 which is registered to the user, receives credentials to access a secure application (step 110). The first device captures the user's activity modalities and sends the user's credentials and activity modalities to a server computer (step 112), for example with the activity modality program 66. The first device will then receive an indication of whether access to the secure application was successful from the server computer (step 114) and the method ends.

Figure 4:
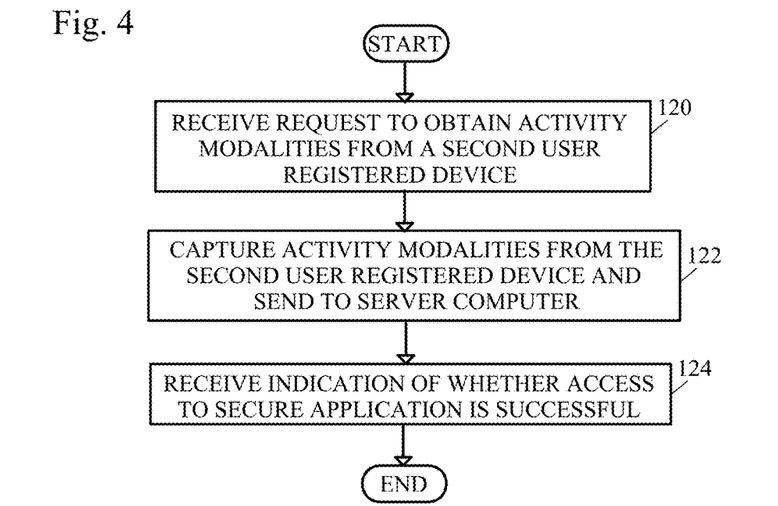
FIG. 4 shows a flow diagram of a method of capturing activity modalities of the user on a second personal device not used to access the secure application.

FIG. 4 shows a flow diagram of a method of capturing activity modalities of the user on a second personal device not used to access the secure application. It should be noted that the first device and second devices are separate devices, but may be the same type of device (e.g. two smart phones).

In a first step (step 120), the second device registered to the user obtains activity modalities, for example by the activity modality program 66. The activity modalities are captured from the second registered device and sent to the server computer (step 122), for example by the activity modality program 66. The method may end after step 122 or the second device may receive an indication of whether the access to the secure application was successful (step 124) and then the method ends. The activity modalities captured are used for as part of the second component of the two-factor authentication process.

Figure 5:
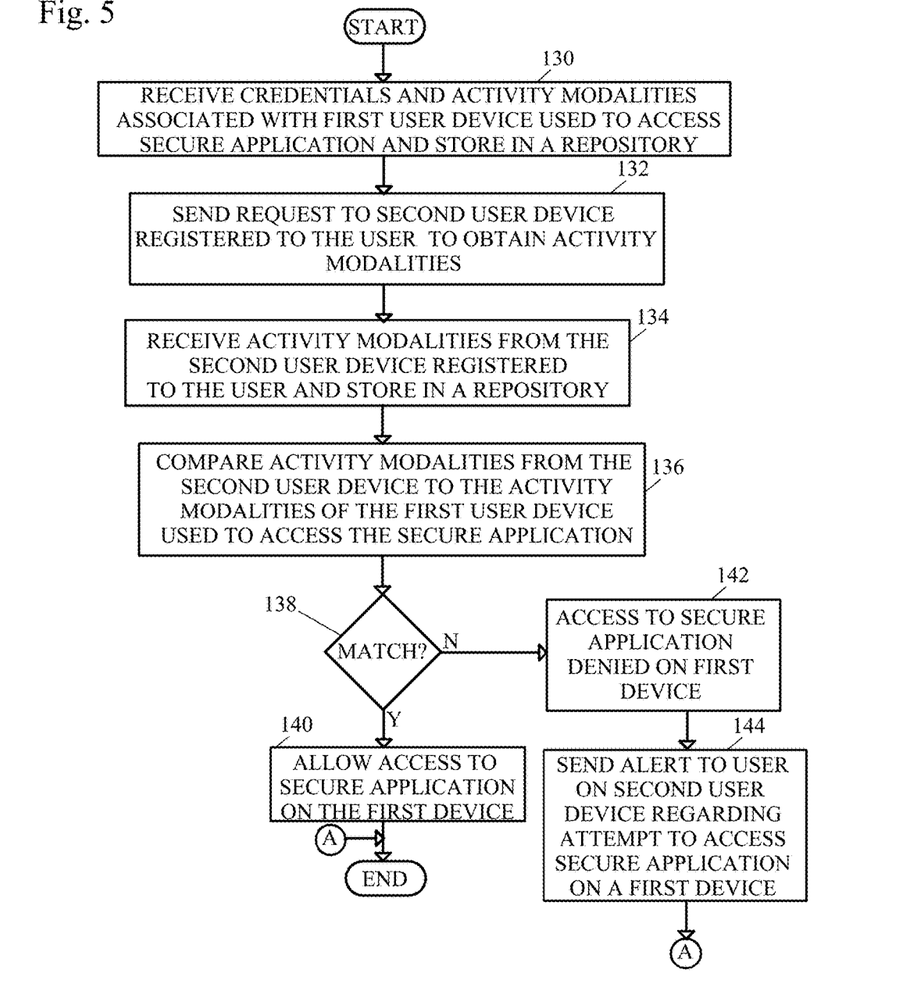
FIG. 5 shows a flow diagram of a method of a server computer using activity modalities of a first device and a second device to determine user authentication and access to the secure application.

FIG. 5 shows a flow diagram of a method of a server computer using activity modalities of a first device and a second device to determine user authentication and access to the secure application.

In a first step (step 130), the server computer receives credentials and detected activity modalities associated with the first user devices used to access the secure application and stores the information in a repository, for example repository 53 of FIG. 1. The server computer, for example through the activity modalities compare program 67 sends a request to another, second registered device of the user to obtain activity modalities (step 132). The server computer receives detected activity modalities from the second registered device and stores the detected activity modalities in a repository (step 134), for example repository 53 of FIG. 1.

The server computer, for example through the activity modalities compare program 67, compares the activity modalities from the second registered device to the activity modalities of the first user device (step 136). It is the results of the comparison that is the second components of the two-factor authentication process.

If a match is present between the activity modalities of the first and the second devices, access is granted to the secure application (step 140) and the method ends. Prior to the method ending, a notification may be sent to the second user device regarding the successful or granted access to the secure application.

If a match is not present between the activity modalities of the first and second devices, access to the secure application is denied (step 142) and an optional notification may be sent to the second device regarding the unsuccessfulness of the attempt to gain access to the secure application (step 144) and the method ends. In an alternate embodiment, after step 142, additional authentication queries may be sent to the user through the first or second devices.

Which activity modalities are detected may be determined based on the sensors present in the registered user devices and the location of the registered user devices relative to the user.

For example, if the registered first or second device of the user is a smart phone or laptop computer which is with the user (e.g. in their hand, inside a pocket, etc. . . . ), location state, locomotive state, and direction state may be detected. If the registered device of the user is nearby (e.g. on the table, in a bag), the location state may be detected.

The location state may include the physical geographical location of the registered devices and/or the position of the registered devices. For detecting the geographical location of the first device and/or the second device, a GPS receiver may be used to determine whether the first device and second device are in the same location.

Alternatively, proximity sensing may be carried out via Bluetooth to transmit a universally unique identifier to another device. The identifier can be used to determine the device's physical location or to initiate a determination of the location of the registered devices relative to each other.

In another embodiment, the location may be determined through cell tower triangulation, or through identification of one or more wi-fi access points available to the first device and the second devices.

The position of the registered devices may be determined using a combination of sensors, such as a light sensor, accelerometer, cameras, digital compass, gyroscope and microphone. The microphone and the camera or light sensor may provide information as to whether the registered devices are inside or outside of a pocket or bag. The accelerometer may provide information as to whether the registered devices are in or out of a pocket, in the hand, within an arm band, on a table or in a state of transition. The gyroscope may provide information as to whether the registered device is being rotated. The digital compass may provide information regarding the orientation of the registered device. Inference models, such as a Gaussian mixture model (GMM) and support vector machine (SVM) may be applied to data from sensors along with temporal smooth using a hidden Markov model (HMM) to detect the position of the device and correlate the sensor information with a correlation in time.

The locomotive state of the registered devices may be detected using sensors, such as an accelerometer, gyroscope, and magnetometer as well as by detecting changes in location using an input from a determination of a location state.

The direction state detects a direction the user is facing. For example, a user using a laptop computer would normally be facing the screen of the laptop computer. This may be determined by a digital compass or one or more cameras in the laptop computer. Other methods may be used to determine the user's direction on a mobile phone or smart phone.

If the registered device of the user is a wearable device computer, the activity modality detected may be the working state of the user (whether the user is idle or working) as detected by determining movement of a specific portion of the user. For example, if the wearable device computer was a watch, an accelerometer sensor in the watch may be used to determine the number of times that an acceleration value exceeds a threshold amount to determine whether the user is typing or using a mobile device. Alternatively, the activity modality could measure whether the device was actively being used through looking for a time since last keystroke or last screen display change, etc.

For example, if a user accesses an application which requires a two-factor authentication and enters their credentials into an interface of the application on a laptop, the laptop sends the credentials entered and the detected activity modalities, such as location state of the user (location of the user), locomotive state of the user (whether the user is moving—walking, running, standing, walking, etc. . . . ). In this example, the laptop determines that its location is in Ithaca, N.Y. and that the laptop is moving. The user's smartphone, another device registered to the user, is queried for activity modalities. If the second device is to be queried for location state of the user, the position of the device is also determined. The smartphone returns that the position of the smart phone is in a pocket of the user, the user's locomotive state is stationary and the location of the smart phone is in West Palm Beach, Fla. The comparison of the activity modalities between the first and the second devices of the laptop and the smart phone do not match and access is denied to the application.

In another example, if a user accesses an application which requires a two-factor authentication and enters their credentials into an interface of the application on a laptop, the laptop sends the credentials entered and the detected activity modalities, such as location state of the user (location of the user), locomotive state of the user (whether the user is moving—walking, running, standing, walking, etc. . . . ). In this example, the laptop determines that its location is in Ithaca, N.Y. and that the laptop is stationary. The user's wearable device, another device registered to the user, is queried for activity modalities. The wearable device returns that the user's locomotive state is stationary, but the user is working. The comparison of the activity modalities between the first and the second devices of the laptop and the wearable device match and access is granted to the application.

In yet another example, a user accesses an application which requires a two-factor authentication and enters their credentials into an interface of the application on a laptop, the laptop sends the credentials entered and the detected activity modalities, such as location state of the user (location of the user). In this example, the laptop determines that its location is in Ithaca, N.Y. The user's smartphone, another device registered to the user, is queried for activity modalities. In this example, the user's smartphone is nearby the user, but not in the user's hand or pocket and is instead in a table across the room from the user and the laptop based on position determination. In this case, the smartphone is queried only for the location state. The smartphone returns that the user's location is in Ithaca, N.Y. The comparison of the activity modalities between the first and the second devices of the laptop and the smart phone match and access is granted to the application.

FIG. 6 illustrates internal and external components of device computer 52, mobile devices 56a-56n, and server computer 54 in which illustrative embodiments may be implemented. In FIG. 6, device computer 52, server computer 54, and mobile devices 56a-56n include respective sets of internal components 800a, 800b, 800c, 800n and external components 900a, 900b, 900c, 900n. Each of the sets of internal components 800a, 800b, 800c, 800n includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828, and activity modality program 66 and activity modality compare program 67 are stored on one or more of the computer-readable tangible storage devices 830 for execution by one or more of the processors 820 via one or more of the RAMs 822 (which typically include cache memory). In the embodiment illustrated in FIG. 6, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800a, 800b, 800c, 800n also includes a R/W drive or interface 832 to read from and write to one or more portable computer-readable tangible storage devices 936 such as a CD-ROM, DVD, memory stick, magnetic tape, magnetic disk, optical disk or semiconductor storage device. Activity modality program 66 and activity modality compare program 67 can be stored on one or more of the portable computer-readable tangible storage devices 936, read via R/W drive or interface 832 and loaded into hard drive 830.

Each set of internal components 800a, 800b, 800c, 800n also includes a network adapter or interface 836 such as a TCP/IP adapter card. Activity modality program 66 can be downloaded to the device computer 52, mobile devices 56a-56n and activity modality compare program 67 can be downloaded to the server computer 54 from an external computer via a network (for example, the Internet, a local area network or other, wide area network) and network adapter or interface 836. From the network adapter or interface 836, activity modality program 66 and activity modality compare program 67 is loaded into hard drive 830. The network may comprise copper wires, optical fibers, wireless transmission, routers, firewalls, switches, gateway computers and/or edge servers.

Each of the sets of external components 900a, 900b, 900c, 900n includes a computer display monitor 920, a keyboard 930, and a computer mouse 934. Each of the sets of internal components 800a, 800b, 800c, 800n also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

Activity modality program 66 and activity modality compare program 67 can be written in various programming languages including low-level, high-level, object-oriented or non object-oriented languages. Alternatively, the functions of an activity modality program 66 or an activity modality compare program 67 can be implemented in whole or in part by computer circuits and other hardware (not shown).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Having thus described the invention of the present application in detail and by reference to embodiments thereof, it will be apparent that modifications and variations are possible without departing from the scope of the invention defined in the appended claims.

What is claimed is:

1. A method of two-factor authentication for gaining access to an application using a first device and a second device registered to a user, the first device and the second device each having a plurality of sensors for detecting activity modalities indicative of a user's behavior relative to the first device and the second device, the first device and the second device in communication with a server computer, comprising the steps of:

the server computer receiving credentials from the first device for gaining access to the application and at least two detected activity modalities of a locomotive state of the user indicating a type of locomotion of the user and a geographical location state of the user detected by the first device;

the server computer sending a request to the second device registered to the user for at least two detected activity modalities of the locomotive state of the user and the geographical location state of the user;

the server computer receiving the at least two detected activity modalities of the locomotive state of the user and the geographical location state of the user from the second device;

the server computer comparing the at least two detected activity modalities of the locomotive state of the user and the geographical location state of the user detected by the first device to the at least two detected activity modalities of the locomotive state of the user and the geographical location state of the user received from the second device; and the server computer granting access to the user on the first device to the application if the at least two detected activity modalities of the locomotive state of the user and the geographical location state of the user detected by the first device matches the at least two detected activity modalities of the locomotive state of the user and the geographical location state of the user received from the second device.

2. The method of claim 1, wherein if the detected activity modalities of first device to the detected activity modalities of the second device mismatch, the server computer denies access to the application.

3. The method of claim 2, further comprising the step of the server computer sending a notification to the second device regarding the denied access to the application.

4. The method of claim 1, wherein the detected active modality of the locomotive state of the user received from the second device includes a working state of the user relative to the second device.

5. The method of claim 1, further comprising the step of the server computer receiving registration information of the user from the first device and the second device.

6. The method of claim 1, further comprising the steps of:
the first device receiving credentials to access the application;
the first device capturing the at least two detected activity modalities of the locomotive state of the user and the geographical location state of the user; and
the first device sending the credentials and the at least two detected activity modalities of the locomotive state of the user and the geographical location state of the user to the server computer.

7. The method of claim 1, further comprising the steps of:
the second device receiving the request for at least two detected activity modalities of the locomotive state of the user and the geographical location state of the user from the server computer;
the second device capturing the at least two detected activity modalities of the locomotive state of the user and the geographical location state of the user; and
the second device sending the at least two detected activity modalities of the locomotive state of the user and the geographical location state of the user to the server computer.

8. A computer program product for two-factor authentication for gaining access to an application using a first device and a second device registered to a user, the first device and the second device in communication with a server computer comprising at least one processor, one or more memories, one or more non-transitory computer readable storage media and the first device and the second device each having:
a computer comprising at least one processor, one or more memories, one or more computer readable storage media, and a plurality of sensors for detecting activity modalities indicative of a user's behavior relative to the first device and the second devices, the computer program product comprising a non-transitory computer readable storage medium having program instructions embodied therewith, the program instructions executable by the computer to perform a method comprising:
receiving, by the server computer, credentials from the first device for gaining access to the application and at least two detected activity modalities of a locomotive state of the user indicating a type of locomotion of the user and a geographical location state of the user detected by the first device;
sending, by the server computer, a request to the second device registered to the user for at least two detected activity modalities of the locomotive state of the user and the geographical location state of the user;
receiving, by the server computer, the at least two detected activity modalities of the locomotive state of the user and the geographical location state of the user from the second device;
comparing, by the server computer, the at least two detected activity modalities of the locomotive state of the user and the geographical location state of the user detected by the first device to the at least two detected activity modalities of the locomotive state of the user and the geographical location state of the user received from the second device; and
granting, by the server computer, access to the user on the first device to the application if the at least two detected activity modalities of the locomotive state of the user and the geographical location state of the user detected by the first device matches the at least two detected activity modalities of the locomotive state of the user and the geographical location state of the user received from the second device.

9. The computer program product of claim 8, wherein if the detected activity modalities of first device to the detected activity modalities of the second device mismatch, denying access, by the server computer, to the application.

10. The computer program product of claim 9, further comprising the program instructions of sending, by the server computer, a notification to the second device regarding the denied access to the application.

11. The computer program product of claim 8, wherein the detected active modality of the locomotive state of the user received from the second device includes a working state of the user relative to the second device.

12. The computer program product of claim 8, further comprising the program instruction of receiving, by the server computer, registration information of the user from the first device and the second device.

13. The computer program product of claim 8, further comprising the program instructions of:
receiving, by the first device, credentials to access the application;
capturing, by the first device, the at least two detected activity modalities of the locomotive state of the user and the geographical location state of the user; and
sending, by the first device, the credentials and the at least two detected activity modalities of the locomotive state of the user and the geographical location state of the user to the server computer.

14. The computer program product of claim 8, further comprising the program instructions of:
receiving, by the second device, the request for at least two detected activity modalities of the locomotive state of the user and the geographical location state of the user from the server computer;
capturing, by the second device, the at least two detected activity modalities of the locomotive state of the user and the geographical location state of the user; and
sending, by the second device, the at least two detected activity modalities of the locomotive state of the user and the geographical location state of the user to the server computer.

15. A computer system for two-factor authentication for gaining access to an application using a first device and a second device registered to a user on the first device, the first device and the second device in communication with a server computer, the server computer comprising a computer comprising at least one processor, one or more memories, one or more computer readable storage media having program instructions executable by the computer to perform the program instructions and the first device and the second device each having: a computer comprising at least one processor, one or more memories, one or more computer readable storage media, and a plurality of sensors for detecting activity modalities indicative of a user's behavior relative to the first device and the second devices, the program instructions comprising:

receiving, by the server computer, credentials from the first device for gaining access to the application and at least two detected activity modalities of a locomotive state of the user indicating a type of locomotion of the user and a geographical location state of the user detected by the first device;

sending, by the server computer, a request to the second device registered to the user for at least two detected activity modalities of the locomotive state of the user and the geographical location state of the user;

receiving, by the server computer, the at least two detected activity modalities of the locomotive state of the user and the geographical location state of the user from the second device;

comparing, by the server computer, the at least two detected activity modalities of the locomotive state of the user and the geographical location state of the user detected by the first device to the at least two detected activity modalities of the locomotive state of the user and the geographical location state of the user received from the second device; and     granting, by the server computer, access to the user on the first device to the application if the at least two detected activity modalities of the locomotive state of the user and the geographical location state of the user detected by the first device matches the at least two detected activity modalities of the locomotive state of the user and the geographical location state of the user received from the second device.

16. The computer system of claim 15, wherein the detected active modality of the locomotive state of the user received from the second device includes a working state of the user relative to the second device.

17. The computer system of claim 15, further comprising the program instructions of:

receiving, by the first device, credentials to access the application;

capturing, by the first device, the at least two detected activity modalities of the locomotive state of the user and the geographical location state of the user; and     sending, by the first device, the credentials and the at least two detected activity modalities of the locomotive state of the user and the geographical location state of the user to the server computer.

18. The computer system of claim 15, further comprising the program instructions of:

receiving, by the second device, the request for at least two detected activity modalities of the locomotive state of the user and the geographical location state of the user from the server computer;

capturing, by the second device, the at least two detected activity modalities of the locomotive state of the user and the geographical location state of the user; and     sending, by the second device, the at least two detected activity modalities of the locomotive state of the user and the geographical location state of the user to the server computer.

19. The computer system of claim 15, wherein if the detected activity modalities of the first device to the detected activity modalities of the second device mismatch, denying access, by the server computer, to the application.

20. The computer system of claim 19, further comprising the program instructions of sending, by the server computer, a notification to the second device regarding the denied access to the application.

\* \* \* \* \*